Jan. 6, 1942.       M. C. TATE       2,268,783
INDICATING APPARATUS
Filed March 17, 1939
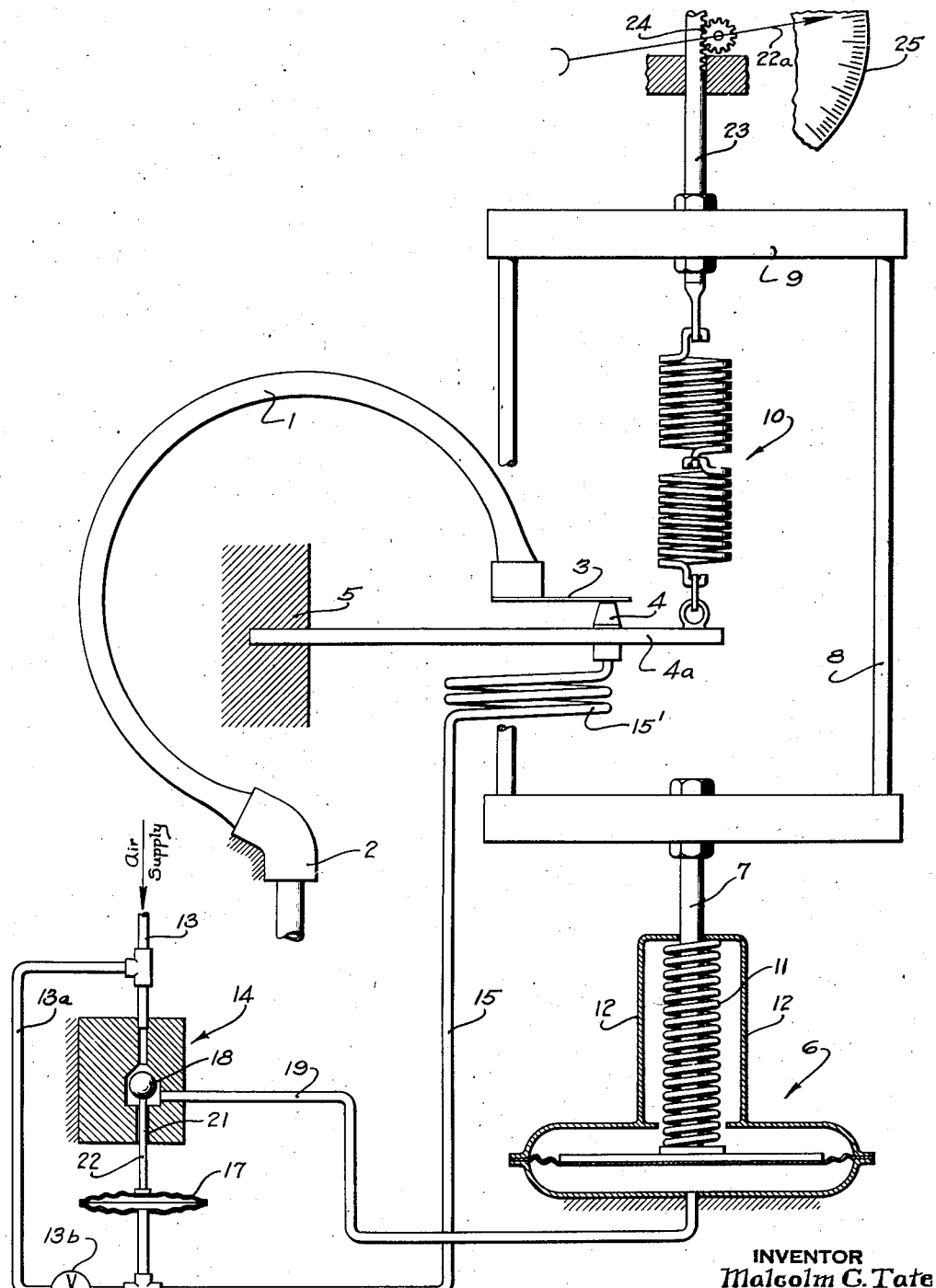
INVENTOR
*Malcolm C. Tate*
BY
ATTORNEY Patented Jan. 6, 1942

2,268,783

UNITED STATES PATENT OFFICE 2,268,783

INDICATING APPARATUS

Malcolm C. Tate, Stamford, Conn., assignor, by mesne assignments to The Baldwin Locomotive Works, a corporation of Pennsylvania Application March 17, 1939, Serial No. 262,507

6 Claims. (Cl. 265—12)

This invention relates generally to a load indicating system and more particularly to a load indicating apparatus that is especially, but not necessarily, applicable to materials testing machines.

It is an object of my invention to provide an improved power-actuated load indicating apparatus, such as a pointer or other devices, under the control of a freely expansible pressure responsive member such as a Bourdon tube but without in any way restricting the action thereof. A further object is to provide an improved indicating apparatus that is simple and compact and can be readily assembled or repaired without disturbing the Bourdon tube.

Other objects and advantages will be more apparent to those skilled in the art from the following description of the accompanying drawing which is a diagrammatic elevation of my improved apparatus.

In the particular embodiment of the invention as illustrated herein, I have shown a pressure responsive element specifically in the form of a Bourdon tube 1 which is suitably anchored as at 2, this tube being supplied with and responsive to pressure fluid from any suitable source such as the main loading cylinder or a hydraulic support of a materials testing machine. One form of such machine may be considered to be that shown in Emery Patent 1,848,468 but which is not shown herein because such machines are well known in the art and hence need not be described for purposes of understanding the present invention, except to point out that the usual preloading springs of the testing machine causes a desired pre-loading or pre-stressing of the Bourdon tube herein. A baffle 3 is secured to the free end of the tube and overlies an air jet 4, these elements cooperating with each other to provide a sensitive means. This air jet is attached to a spring cantilever 4a whose inner end is anchored in a suitable wall 5 while the outer end is biased upwardly preferably by an air controlled expansible servo-motor 6 which for purposes of illustration is shown as of the diaphragm type. The diaphragm is connected to a stem 7 which, in turn, carries a frame 8 having an upper crosshead 9. Interposed between crosshead 9 and the outer end of cantilever 4a is suitable extensible means preferably in the form of an iso-elastic spring having preferably a straight line stress-strain relation. The servo-motor 6 is normally continuously biased in one direction, specifically downwardly, by a spring 11 interposed between the diaphragm and suitable brackets 12 secured to the servo-motor 6.

To control the servo-motor, the baffle 3 and air jet 4 suitably control the operating pressure on the under side of the servo-motor diaphragm. This is specially accomplished herein by supplying air pressure from any suitable source through pipes 13 and 13a and thence through an adjustable throttle 13b to an air relay valve generally indicated at 14. This arrangement is such that when baffle 3 moves upwardly very slightly away from jet 4 air may flow more freely through a pipe 15 and consequently the pressure in pipe 15 decreases. This decreased pressure allows a bellows 17 to contract slightly so as to cause a ball valve 18 to move downwardly thereby allowing air pressure to flow from supply pipe 13 to a pipe 19 leading to servo-motor 6. This increase in supply of pressure to the servo-motor causes its diaphragm to move upwardly and thereby raise frame 8 and crosshead 9 and consequently increase the tension on spring 10 so as to pull cantilever 4a upwardly together with air jet 4. When the air jet 4 has approached a predetermined substantially normal relation to baffle 3 the air pressure in pipe 15 is restored to its previous value thereby slightly expanding bellows 17 so as to move ball valve 18 upwardly to reduce or shut off flow of air through pipe 19 to the servo-motor whereupon the servo-motor movement is stopped. Conversely, if the Bourdon tube 1 should contract due to a decrease in load then baffle 3 moves toward jet 4 so as to increase pressure in pipe 15 and consequently expand bellows 17 so as to move valve 18 toward its closed position and thereby allow exhaust of pressure from the servo-motor through pipe 19 and a clearance space 21 surrounding the valve stem 22. Decrease of pressure in the servo-motor permits spring 11 to move frame 8 and crosshead 9 downwardly so as to reduce the tension on spring 10 until the normal relation is substantially reestablished between jet 4 and baffle 3. Re-establishment of the jet-baffle relation restores a balanced pressure condition in the system with the result that the motor remains stationary until a further pressure change occurs in the Bourdon tube. The pipe 15 is provided with a suitable resilient coil 15' in order to allow free movement of the cantilever 4a.

A suitable load indicating pointer diagrammatically indicated at 22a is operated by the power of servo-motor 6 through frame 8 and a stem 23 secured thereto for operating a rack and pinion 24. A usual dial diagrammatically indicated at 25 cooperates with pointer 22a, although in accordance with the disclosure in my copending application Serial No. 61,029, filed January 27, 1936, the rod 23 may operate other devices such as shown therein and broadly referred to as load indicating means.

The function of spring 10 is to allow the servo-motor and its frame 8 to have a large increment of movement for each small increment of movement of jet 4 thereby insuring a large magnification of minute movements of the free end of Bourdon tube 1. This arrangement is such that friction or other extraneous forces tending to retard movement of frame 8 does not affect the accuracy of load indication. This is because the final position of frame 8 is determined solely by the position of baffle 3 together with a predetermined bending force of cantilever 4a. Thus it is seen that I have provided an arrangement which permits the Bourdon tube to have unrestrained and free movement and yet embodies the air jet-baffle principle for effecting a normally balanced force condition in the power operated elements except when this balanced condition is momentarily disturbed by a change of pressure in the Bourdon tube.

It will of course be understood that various changes in details of construction and arrangement of parts may be made by those skilled in the art without departing from the spirit of the invention as set forth in the appended claims.

I claim:

1. In combination, a pressure responsive Bourdon tube member freely movable in response to pressure changes, a servo-motor, indicating means operated by said servo-motor, and means for controlling said servo-motor in accordance with pressure changes in said pressure responsive member including air jet and baffle elements one of which is carried by said movable member so as to be freely movable therewith and the other of which is connected to and moved by the power of said servo-motor in response to relative movement between said elements occasioned by a change in pressure in said responsive means whereby movement of said servo-motor continues until a predetermined relation is established between said air jet and baffle elements, the connection of said servo-motor to said other element including yieldable extensible means whereby said servo-motor and indicating means operated thereby have a relatively large movement for each increment of relative movement between the jet and baffle.

2. In combination, a force responsive Bourdon tube member freely movable in response to changes of force therein, a fluid controlled motor continuously biased in one direction, means including air jet and baffle elements for controlling the pressure fluid medium of said motor by said responsive member, one of said elements being freely movable with said force responsive member and the other element having controlled movement, means including an extensible member for cooperatively connecting the other element to said motor so as to effect controlled movement of said other element thereby to maintain said jet and baffle in a substantially constant relation to each other throughout variations in force to which said member is subjected, said extensible member allowing said servo-motor to have a large movement for a relatively small increment of relative movement between said jet and baffle and means connected to and moved a substantial distance by said member for each increment of motor force that is required to maintain said air jet and baffle in said substantially constant relation.

3. In combination, a freely movable pressure responsive Bourdon tube member continuously biased in one direction when under the influence of pressure to be weighed, a continuously biased fluid controlled servo-motor, cooperating air jet and baffle elements for controlling pressure fluid of said motor and normally having substantially predetermined relation, one of said elements being freely movable with said responsive member upon occurrence of a pressure change in said pressure responsive member thereby to control the operating force of said servo-motor in accordance with the pressure being weighed, means whereby said servo-motor effects movement of the other of said elements so as to restore the same substantially to a predetermined relation after the pressure change in said pressure responsive member, and mechanism operated by said servo-motor, said restoring means including a yieldable extensible member whereby said servo-motor and mechanism operated thereby have a relatively large movement for each increment of relative movement between said air jet and baffle elements 4. In combination, a pressure responsive Bourdon tube member freely movable in responsive to pressure changes therein, cooperating sensitive elements one of which is freely movable with said responsive member, a cantilever flexure plate having one end fixed and the other end yieldingly supporting the other sensitive element, a fluid pressure controlled power mechanism for flexing said member and thereby moving said yieldingly sensitive element so as to maintain said elements in a substantially predetermined relation during free movement of the responsive member, and means for controlling said power mechanism by said sensitive elements thereby to effect said predetermined relation between said sensitive elements.

5. In combination, a Bourdon tube having an end freely movable in responsive to pressure changes therein, cooperating air jet and baffle elements one of which is freely movable with said Bourdon tube, and means for moving the other of said elements so as to follow up the free expansion of the Bourdon tube in response to pressure changes therein, including a servo-motor controlled by said jet and baffle elements and extensible means interposed between said servo-motor and one of said elements so as to maintain said elements in a predetermined relation to each other upon occurrence of relative movement between the same occasioned by a change of pressure in the Bourdon tube, said extensible means allowing said servo-motor to have a relatively large increment of movement between said jet and baffle.

6. In combination, a fluid pressure responsive Bourdon tube element freely movable upon occurrence of pressure changes therein, air jet and baffle elements one of which is secured to said responsive member so as to be freely movable therewith, means for movably supporting the other of said elements so that said elements are adapted to be maintained in a predetermined relation to each other, a fluid servo-motor controlled by said air jet and baffle, yieldable extensible means connecting said motor to said movably supported element thereby to maintain said jet and baffle elements in a predetermined relation throughout movement of said responsive member, and having the large increment of movement of said motor in response to relatively small increments of movement of said pressure responsive member.

MALCOLM C. TATE.